(12) United States Patent
Watanabe et al.

(10) Patent No.: US 10,656,464 B2
(45) Date of Patent: May 19, 2020

(54) LIGHTING DEVICE AND DISPLAY DEVICE

(71) Applicant: SHARP KABUSHIKI KAISHA, Sakai, Osaka (JP)

(72) Inventors: Hisashi Watanabe, Sakai (JP); Hirotoshi Yasunaga, Sakai (JP); Youzou Kyoukane, Sakai (JP)

(73) Assignee: SHARP KABUSHIKI KAISHA, Sakai, Osaka (JP)

( * ) Notice: Subject to any disclaimer, the term of this patent is extended or adjusted under 35 U.S.C. 154(b) by 0 days.

(21) Appl. No.: 16/289,930

(22) Filed: Mar. 1, 2019

(65) Prior Publication Data
US 2019/0271884 A1 Sep. 5, 2019

(30) Foreign Application Priority Data

Mar. 1, 2018 (JP) ................. 2018-036916

(51) Int. Cl.
*G02F 1/133* (2006.01)
*G02F 1/13357* (2006.01)

(52) U.S. Cl.
CPC .. *G02F 1/133611* (2013.01); *G02F 1/133603* (2013.01); *G02F 1/133605* (2013.01); *G02F 1/133606* (2013.01)

(58) Field of Classification Search
CPC ................................. G02F 1/133611
See application file for complete search history.

(56) References Cited

U.S. PATENT DOCUMENTS

2015/0346551 A1\* 12/2015 Sun .................. G02F 1/133608
362/97.1

FOREIGN PATENT DOCUMENTS

| JP | 2010-282852 A | 12/2010 |
| JP | 2011-181464 A | 9/2011 |

\* cited by examiner

*Primary Examiner* — Anne M Hines
(74) *Attorney, Agent, or Firm* — ScienBiziP, P.C.

(57) ABSTRACT

A lighting device (1) includes a substrate (2), a light source arranged on a surface of the substrate (2), and a light diffusing member (4) configured to diffuse light emitted from the light source. The light diffusing member (4) is composed of a sheet base or a film base having a light-diffusing resin layer, and a projection (41) that protrudes in a direction of the substrate (2) and that is integrated with the sheet base or the film base.

9 Claims, 9 Drawing Sheets

LIGHTING DEVICE AND DISPLAY DEVICE

CROSS-REFERENCE TO RELATED APPLICATIONS

The present application claims priority under 35 U.S.C. § 119(a) to Japanese Patent Application No. 2018-36916, filed Mar. 1, 2018. The contents of this application are incorporated herein by reference in its entirety.

BACKGROUND OF THE INVENTION

Field of the Invention

The present invention relates to a lighting device equipped with a light diffusing member, and a display device using the lighting device.

Description of the Related Art

A liquid crystal display device is composed of two transparent substrates and a liquid crystal sealed therebetween. When a voltage is applied, liquid crystal molecules are reoriented to change the light transmittance, so that the display device can optically display a predetermined image or the like. A liquid crystal display device of this type is equipped with a backlight unit, for example, that emits light from behind a transmissive liquid crystal panel, using LEDs or the like as a light source.

A backlight unit in which the light source is arranged on the bottom surface and light is emitted through a light diffusing plate is called direct-lit backlight system. When the light source in the direct-lit backlight system is composed of LEDs with a particularly high directivity, the backlight unit is desired to emit light at an intensity equalized in a planar direction.

For example, JP 2010-282852 A teaches a planar lighting device provided with a case for housing light source units and a light diffusing member for covering the opening of the case. The light source units are spaced from each other, and the light diffusing member is disposed at a distance away from light conductive reflection members of the light source units.

For uniform emission of light, it is preferable to position the light diffusing member away from the light source. For this purpose, the above conventional lighting device has employed a plate-like light diffusing member having a considerable thickness. For the lighting device, however, the thick light diffusing member is not only disadvantageous in downsizing but also costly. Hence, use of a thin sheet-like or film-like light diffusing member has been desired.

Despite such a demand, it is difficult to place a thin sheet-like or film-like light diffusing member stably in the lighting device, while keeping a certain distance from the light source.

SUMMARY OF THE INVENTION

An object of the present invention is to provide a lighting device in which a light diffusing member is placed at a distance from a light source without increasing the size and weight of the lighting device and which can emit light uniformly, and also to provide a display device using the lighting device.

A solution to achieve the above object according to the present invention is a lighting device that includes a substrate, a light source provided on a surface of the substrate, and a light diffusing member configured to diffuse light emitted from the light source. The light diffusing member includes a sheet base or a film base having a light-diffusing resin layer, and at least one projection that protrudes in a direction of the substrate and that is integrated with the sheet base or the film base.

Owing to this specified matter, the projection ensures a distance between the substrate and the light diffusing member by at least a protruding amount of the projection, so that the light diffusing member can be placed at a certain distance from the light source. Since the projection is integrated in the light diffusing member, it is possible to avoid an increase in weight and cost, and to enhance productivity.

As a more specific configuration, the lighting device has a plate-like reflective member provided between the light source and the light diffusing member. The reflective member includes a reflection part configured to reflect the light emitted from the light source, and a transmission part configured to transmit the light emitted from the light source. The reflection part occupies a greater proportion of the reflective member than the transmission part, in an area closer to a spot above the light source.

According to this configuration, the reflective member can reflect at least a part of the light emitted from the light source, so that the lighting device can enhance uniformity of luminance in the planar direction.

Preferably, the light diffusing member is provided such that the projection is positioned above either of the reflection part or the transmission part. The resulting lighting device can emit light through the light diffusing member while reducing uneven luminance, and can thereby ensure uniformity of emitted light.

In a preferable mode of the lighting device, a strut member is provided upright on the substrate, and the reflective member is supported by the strut member. In this lighting device, the reflective member for enhancing uniformity of luminance can be stably disposed at a certain distance from the light source.

In a preferable mode of the lighting device, the light diffusing member is provided such that the projection is positioned above the strut member. This configuration allows stable placement of the light diffusing member in the lighting device.

In another mode of the lighting device, the light diffusing member may include a plurality of projections. This configuration allows more stable placement of the light diffusing member.

In another mode of the lighting device, the projection may be a rib-like projection extending in a predetermined direction of the light diffusing member. This configuration allows balanced stable placement of the light diffusing member.

In a preferable mode of the lighting device, the projection includes a plurality of projections that extend in different directions and that intersect with each other at an intersection, and the light diffusing member is provided such that the intersection is positioned above the strut member. This configuration allows more stable placement of the light diffusing member without misalignment.

In a preferable mode of the lighting device, the projection protrudes by 1 to 5 mm. This configuration can enhance light-diffusivity, uniformity of emitted light, and simple formability with respect to the light diffusing member.

Furthermore, the solution to achieve the above object according to the present invention encompasses, in its technical concept, a display device including a display panel and a lighting device that emits light from behind the display panel. Namely, a display device equipped with the lighting device having any of the above-mentioned configurations can enhance its display performance by utilizing the light that is emitted uniformly while preventing uneven luminance.

According to the present invention, the light diffusing member can be placed at a certain distance from the light source without increasing the size and weight of the lighting device. As a result, the lighting device can emit light uniformly, and the display device can properly display an image or the like on the screen while reducing local variations in luminance and uneven luminance.

DETAILED DESCRIPTION OF THE INVENTION

Hereinafter, a lighting device and a display device according to embodiments of the present invention are described with reference to the drawings.

Embodiment 1

Figure 1:
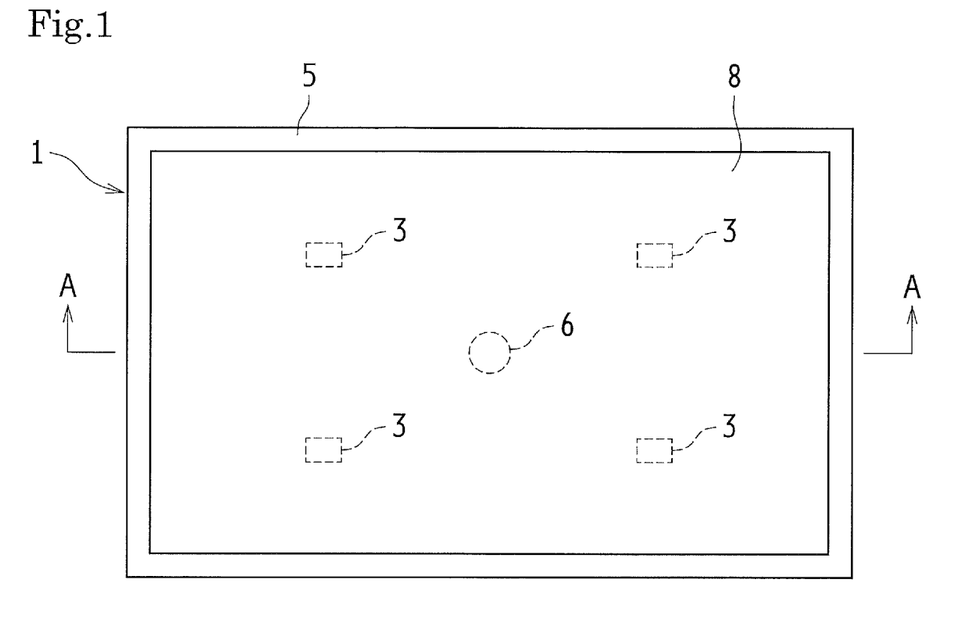
FIG. 1 is a plan view of a lighting device according to Embodiment 1 of the present invention.
Figure 2:
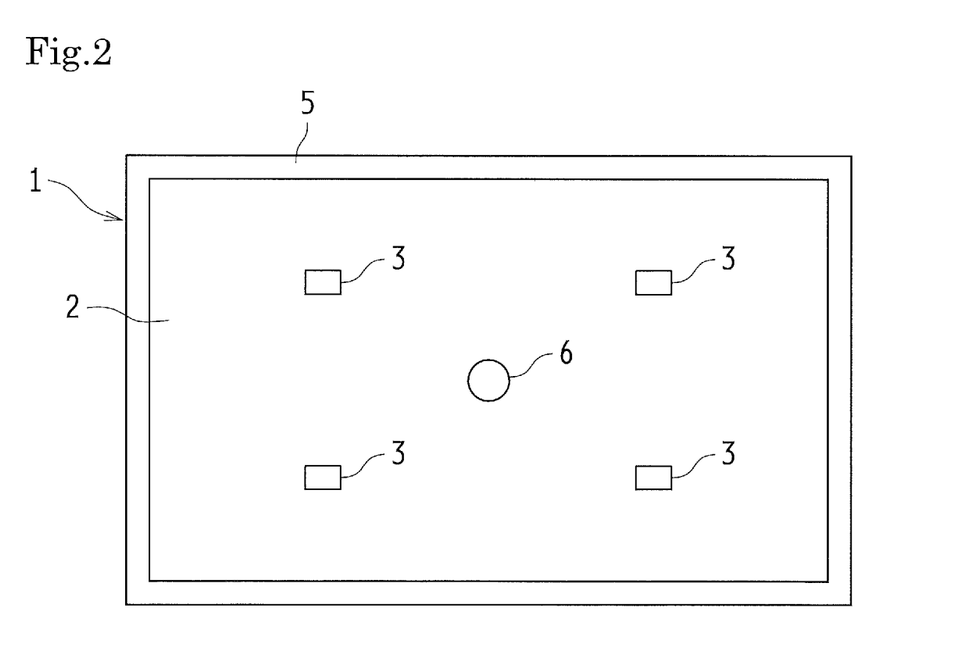
FIG. 2 is a plan view of a frame and a substrate in the lighting device.
Figure 3:
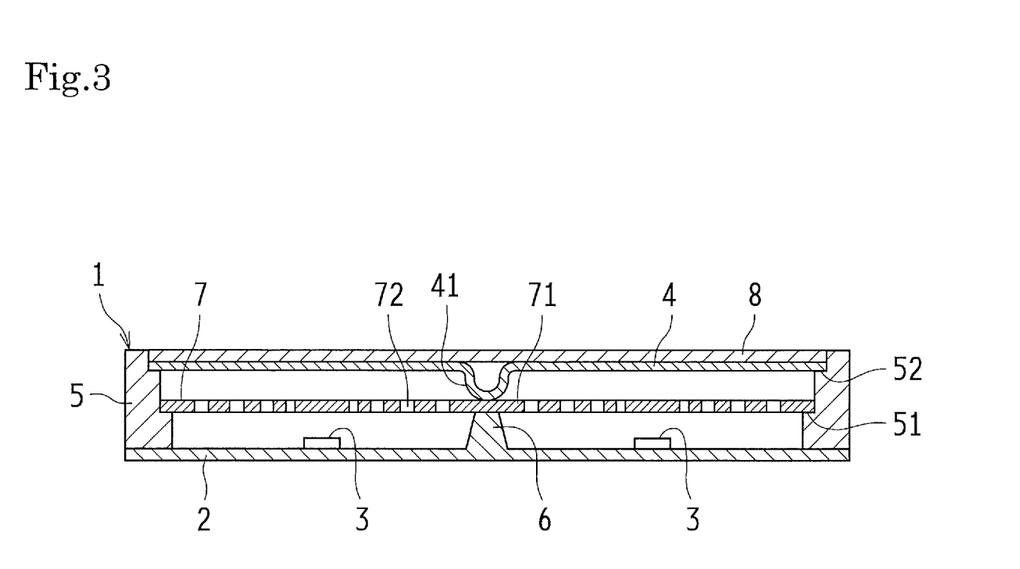
FIG. 3 is a sectional view taken along A-A in FIG. 1.
Figure 4:
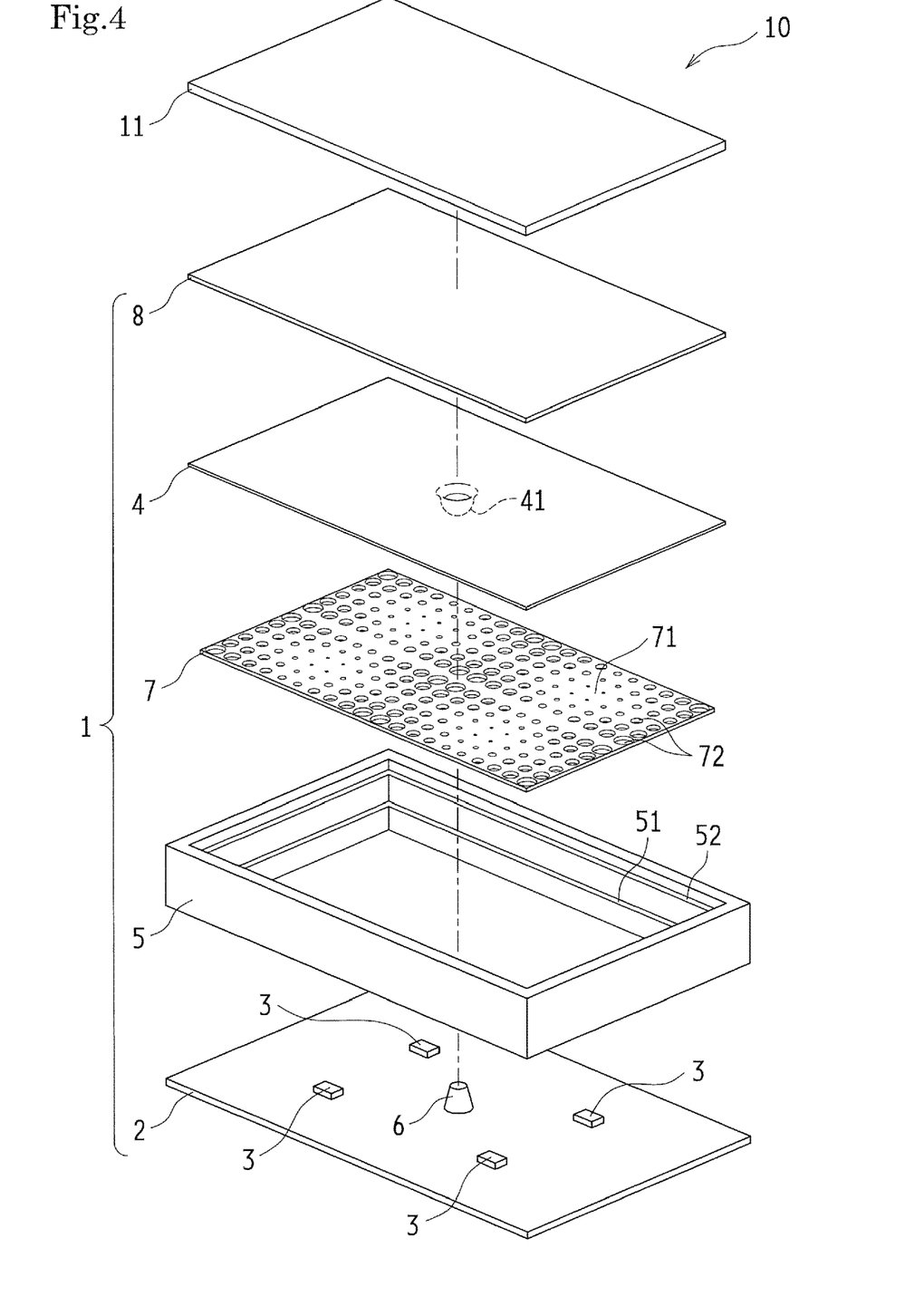
FIG. 4 is an exploded perspective view of a display device using the lighting device.

FIGS. 1 to 3 show a lighting device 1 according to Embodiment 1 of the present invention. FIG. 4 shows a display device 10 using the lighting device 1.

As shown in FIGS. 2 and 3, the lighting device 1 is provided with a substrate 2, LEDs 3 arranged on a surface of the substrate 2 as a light source, a light diffusing member 4 configured to diffuse light emitted from the LEDs 3, a frame 5 disposed along the outer periphery of the light diffusing member 4, a reflective member 7, and the like. The lighting device 1 in this embodiment adopts the direct-lit backlight system, in which the LEDs 3 are arranged directly below the light diffusing member 4 and have their light-emitting surfaces opposed to the light diffusing member 4.

The frame 5 has a rectangular frame-like shape, and is made of a material such as polycarbonate that presents a highly reflective white color. The LEDs 3 are top-emitting LEDs that are surface mounted on the substrate 2, with their light-emitting surfaces facing away from the substrate 2. The LEDs 3 are positioned such that their light-emitting surfaces are opposed to the plate surfaces of the reflective member 7 and the light diffusing member 4.

For example, the LEDs 3 are white LEDs, in which LED chips (LED elements), as semiconductor light-emitting elements, are fixed on a plate surface of the substrate 2 and sealed by a resin material. Namely, the LED chips mounted on the substrate 2 have one type of main emission wavelength, and specifically emit monochromatic blue light. On the other hand, the resin material for sealing the LED chips contains a phosphor in a dispersed manner. This phosphor is excited by the blue light emitted from the LED chips and thereby emits a prescribed color. As a whole, the resin material emits substantially white light.

On the surface of the substrate 2, the LEDs 3 are arranged at a plurality of positions in a balanced manner. As shown in FIG. 2, the substrate 2 is a plate that is rectangular in plan view and larger than the LEDs 3, and is placed under the frame 5. The base material for the substrate 2 is a metallic material such as an aluminum-based material, a glass epoxy material, etc. A wiring pattern (not shown) made of a metal film such as copper foil is formed on the surface of the substrate 2 via an insulating layer.

The surface of the substrate 2 on which the LEDs 3 are mounted is provided with a white reflective layer (not shown). This reflective layer can reflect the light emitted from the LEDs 3 and sent back toward the substrate 2, and can direct the reflected light to the front side as emitted light. Although not shown, the driving power for the substrate 2 is supplied from an LED-driving substrate via a wiring member.

(Strut Member)

The lighting device 1 has a strut member 6 that stands upright on the substrate 2. The strut member 6 and a first shoulder 51 support the reflective member 7 to be described. Similar to the frame 5, the strut member 6 is made of a synthetic resin such as polycarbonate, and its surface presents a highly reflective white color. The strut member 6 is interposed between the reflective member 7 and the substrate 2 serving as the bottom of the frame 5 and supports the reflective member 7 from below.

As shown in FIG. 2, the present embodiment provides one strut member 6 substantially at the center of the substrate 2. The LEDs 3 are provided around the strut member 6 at four equidistant positions from the strut member 6.

As shown in FIG. 3, the strut member 6 has a shape of a substantially circular truncated cone, and is bonded on the substrate 2 to stand upright. The thus arranged strut member 6 protrudes from the substrate 2 to the reflective member 7, with the top face of the strut member 6 abutting on the back surface of the reflective member 7.

(Reflective Member)

The plate-like or sheet-like reflective member 7 is provided above the LEDs 3 and reflects light at its surface. The surface of the reflective member 7 presents a highly reflective white color. The reflective member 7 has a reflection part 71 configured to reflect the light emitted from the LEDs 3, and a transmission part 72 configured to transmit the light emitted from the LEDs 3.

As shown in FIG. 4, the reflective member 7 is interposed between the LEDs 3 and the light diffusing member 4 in the direction normal to the surface of the substrate 2. In other words, the reflective member 7 is disposed in an intermediate position between the LEDs 3 and the light diffusing member 4, and is opposed to the LEDs 3 and the light diffusing member 4, respectively, with predetermined gaps. The reflective member 7 is rectangular in plan view and is accommodated in the frame 5.

In the embodiment shown in FIG. 3, the reflective member 7 covers the substrate 2, with its outer periphery resting on the first shoulder 51 of the frame 5 and with its center being supported by the strut member 6.

As shown in FIG. 4, the transmission part 72 of the reflective member 7 is composed of a plurality of openings arranged in a predetermined distribution pattern along the plane. The transmission part 72 is configured to transmit a part of the light emitted from the LEDs 3. The other part of the reflective member 7 except the openings is the reflection part 71 configured to reflect the light emitted from the LEDs 3.

The distribution pattern of these openings controls the amount of transmitted light per unit area in the plane of the reflective member 7. In the illustrated embodiment, the openings are sparser in an area of the reflective member 7 closer to a spot directly above the LEDs 3, such that the reflection part 71 occupies a greater proportion than the transmission part 72. Namely, in the reflective member 7, the openings that constitute the transmission part 72 are selectively provided at the spots directly above the area without the LEDs 3. The light emitted from the LEDs 3 is partly reflected by the reflection part 71 that has no openings, and is partly transmitted and emitted from the transmission part 72.

The transmission part 72 is arranged in a planar matrix pattern around each LED 3. As the openings are farther away from the spot directly above each LED 3 in plan view, the openings have a greater diameter and a greater area. This configuration can equalize the amounts of light emitted from the LEDs 3 to the light diffusing member 4 in the planar direction, and can keep the optical reflectance and the light transmittance uniform throughout the reflective member 7.

The transmission part 72 shown in FIG. 3 is composed of through-holes penetrating the front and back surfaces of the reflective member 7. Instead, the transmission part 72 may be composed of dents that are thinner than the reflection part 71.

One of the methods for forming the reflection part 71 and the transmission part 72 in the reflective member 7 is to form through-holes in a sheet-like or plate-like base (e.g., a white resin sheet, a metal deposition sheet, or a metal plate), in a predetermined pattern according to the above-mentioned regularity.

Methods for forming the through-holes include die pressing, drilling, laser processing or the like for a white resin sheet; and etching of high-precision through-holes for a metal deposition sheet or a metal plate. Other methods include printing of the predetermined pattern on a surface of a translucent sheet by white ink, and mask deposition of a metal film in the predetermined pattern.

As shown in FIG. 3, the strut member 6 supports the reflective member 7 from behind, namely, from the side of the substrate 2, and fixes the planar arrangement of the reflective member 7 relative to the LEDs 3. The strut member 6 meets the reflective member 7 at the reflection part 71, not at the transmission part 72. The reflective member 7 is configured to be held by the first shoulder 51 of the frame 5 and the strut member 6, thereby keeping a proper position without misalignment relative to the LEDs 3 mounted on the substrate 2.

(Light Diffusing Member)

As shown in FIG. 3, the light diffusing member 4 is provided on and above the reflective member 7. The light diffusing member 4 covers the reflective member 7, with its outer periphery resting on the second shoulder 52 of the frame 5. The light diffusing member 4 lies between an optical sheet 8 (to be described) and the reflective member 7. The light diffusing member 4 is provided on the front side (i.e., the light-emitting side) relative to the reflective member 7, and is opposed to the reflective member 7 with a predetermined gap.

The light diffusing member 4 is made of a sheet base or a film base having a light-diffusing resin layer (not shown). For example, the light diffusing member 4 is a sheet-like or film-like member composed of a substantially transparent resin base and a resin layer formed therein. The resin base is thinner than the reflective member 7. In this resin base, multiple diffusion particles having different refractive indexes are dispersed to form the resin layer. The light diffusing member 4 functions to diffuse light passing therethrough. The light diffusing member 4 may also be a sheet-like or film-like member in which the resin layer is formed by coating the resin base with a dispersion mixture that contains multiple diffusion particles having different refractive indexes in a dispersed manner, or in which the resin layer is composed of multiple bumps and dents provided on the surface of the resin base. Further, the light diffusing member 4 may be composed of a plurality of such film-like members laminated on each other.

The light diffusing member 4 has a projection 41 that protrudes in the direction of the substrate 2. As shown in FIGS. 3 and 4, the projection 41 is integrally formed in a protruding manner at the center of the light diffusing member 4 by sheet forming, die press molding, etc. The shape of the projection 41, which only needs to protrude in the direction of the substrate 2, is not particularly limited. Having said that, a shape that gives a proper supporting strength and a simple formability is desirable. Accordingly, the projection 41, as illustrated, has a generally semi-spherical shape with a semi-circular cross section, protruding to the backside of the light diffusing member 4 and having no corners.

The light diffusing member 4 is relatively thin, for example, in a thickness of about 0.1 to 1.0 mm. Due to the thin body, the light diffusing member 4, if simply put on the second shoulder 52 of the frame 5, tends to deflect around the center and to have difficulty in keeping a certain distance from the reflective member 7. In this regard, the present embodiment provides the projection 41 at the center of the light diffusing member 4. The projection 41 abuts on the surface of the reflective member 7 to keep a certain distance between the light diffusing member 4 and the reflective member 7, and effectively prevents deflection of the light diffusing member 4.

The projection 41 is positioned at the center of the light diffusing member 4, namely, above the strut member 6. The projection 41 is equidistantly positioned from the four LEDs 3 that are mounted on the substrate 2. The reflection part 71 of the reflective member 7 lies directly below the center of the light diffusing member 4. Thus, the projection 41 is located close to the surface of the reflective member 7, but not at the border of the reflection part 71 and the transmission part 72, so that the light emitted from the LEDs 3 can be uniformly diffused.

Preferably, the projection 41 protrudes by 1 to 5 mm from the back surface of the light diffusing member 4. If the projection 41 protrudes by less than 1 mm, the light diffusing member 4 is so close to the reflective member 7 that the luminance of the light emitted from the light diffusing member 4 is likely to be uneven. If the projection 41 protrudes by more than 5 mm, forming of the projection 41 and proper placement of the light diffusing member 4 may be difficult. Considering light-diffusivity, uniformity of emitted light, and simple formability with respect to the light diffusing member 4, it is preferable for the projection 41 to protrude by 1 to 5 mm. The light emitted from the light diffusing member 4 is equalized in the planar direction, while reducing locally uneven luminance.

(Optical Sheet)

The lighting device 1 is preferably provided with an optical sheet 8. As shown in FIGS. 3 and 4, the optical sheet 8 covers the light diffusing member 4, with its outer periphery resting on the frame 5. The optical sheet 8 is a thin sheet, preferably composed of a plurality of sheets laminated on each other. An example of the optical sheet 8 is a luminance-enhancing prism sheet that imparts an anisotropic light-collecting effect to the light.

As described above, the lighting device 1 stably maintains the planar arrangement of the components relative to the LEDs 3, by mounting the LEDs 3 on the substrate 2, supporting the reflective member 7 with the strut member 6, and supporting the light diffusing member 4 on the reflective member 7. The resulting lighting device 1 can present high optical performances of the respective members, can reduce local variations in luminance and uneven luminance, and can emit light at an intensity equalized in the planar direction. Besides, integration of the projection 41 in the light diffusing member 4 can avoid loss of light-diffusivity, and can reduce the weight and number of components of the device.

(Display Device)

The lighting device 1 according to the present invention is applicable to a display device 10 such as a liquid crystal display device. As shown in FIG. 4, the display device 10 is composed of a display panel 11 (e.g., a liquid crystal panel) that displays an image, and the lighting device (a backlight unit) 1 as an external light source that supplies the display panel 11 with light for display. The display panel 11 and the lighting device 1 are integrated by a frame-like bezel, etc.

The display panel 11 has a horizontally elongated rectangular shape in plan view. For example, a pair of glass substrates is bonded to each other with a predetermined gap, and a liquid crystal layer containing liquid crystal molecules is sealed between the two glass substrates. On application of an electrical field, these liquid crystal molecules change their optical characteristics. The lighting device 1 emits light to the display panel 11 from behind. The optical sheet 8 lies between the display panel 11 and the light diffusing member 4 so as to enhance the luminance on the screen efficiently.

Embodiment 2

Figure 5:
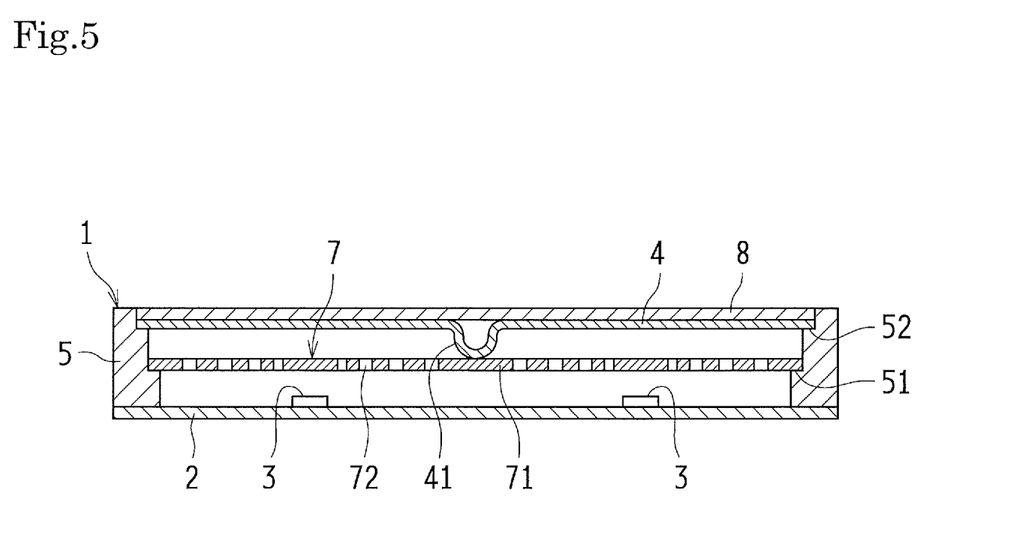
FIG. 5 is a sectional view of a lighting device according to Embodiment 2 of the present invention.

FIG. 5 is a sectional view (corresponding to FIG. 3) of a lighting device 1 according to Embodiment 2 of the present invention. Lighting devices 1 according to Embodiments 2 to 5 below have the same basic components as the lighting device 1 in Embodiment 1. Hence, common components are indicated by identical reference numerals given in Embodiment 1 to omit their detailed description.

The lighting device 1 according to this embodiment is relatively small. In the frame 5, the distance between the opposed first shoulders 51 and the distance between the opposed second shoulders 52 are smaller than the corresponding distances in Embodiment 1. In this case, the strut member 6 on the substrate 2 may be omitted essential, and the reflective member 7 can be held stably without the strut member 6. The lighting device 1 having this structure can emit light that is uniform in the planar direction, and can reduce the weight and size of the lighting device 1 still further.

Embodiment 3

Figure 6:
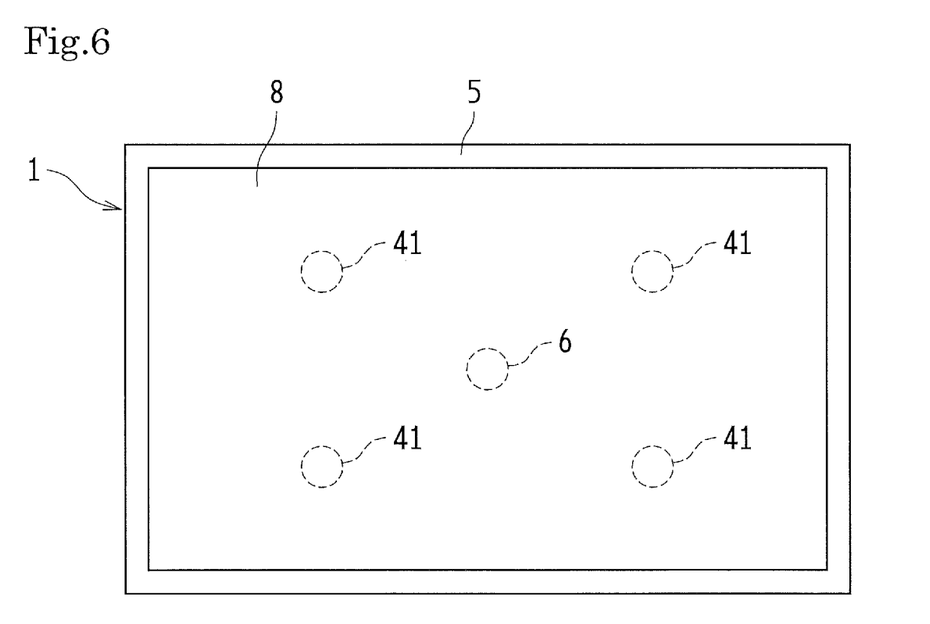
FIG. 6 is a plan view of a lighting device according to Embodiment 3 of the present invention.
Figure 7:
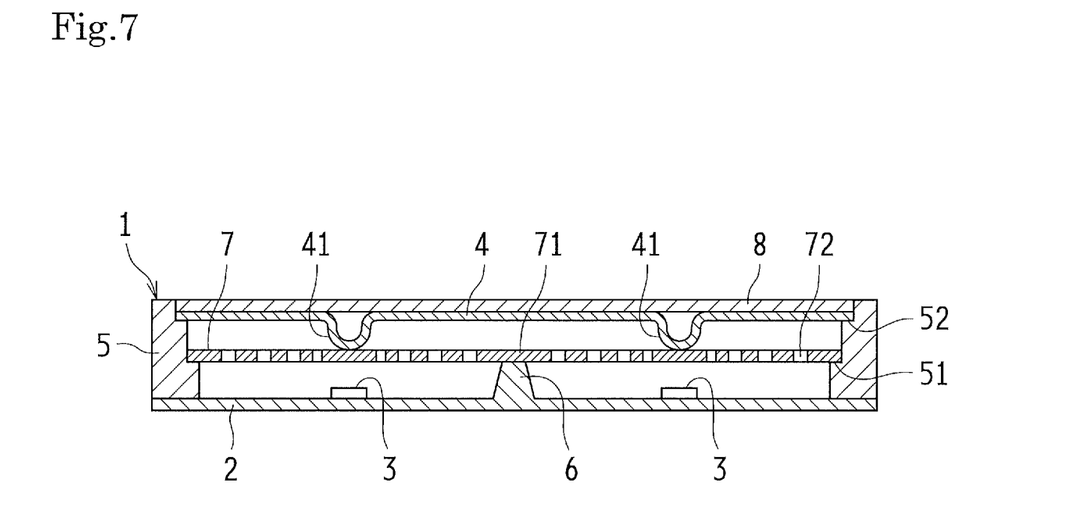
FIG. 7 is a sectional view of the lighting device according to Embodiment 3 of the present invention.

FIGS. 6 and 7 show a lighting device 1 according to Embodiment 3 of the present invention. FIG. 6 is a plan view, and FIG. 7 is a sectional view (corresponding to FIG. 3).

The lighting device 1 has a plurality of projections 41 in the light diffusing member 4. Similar to Embodiment 1, four LEDs 3 are mounted on the substrate 2. In contrast to Embodiment 1, the light diffusing member 4 disposed on the reflective member 7 has four projections 41 corresponding to the arrangement pattern of the LEDs 3, as shown in FIG. 6. Namely, the four projections 41 are disposed directly above the corresponding LEDs 3. Since the reflection part 71 of the reflective member 7 lies directly above the LEDs 3, the projections 41 of the light diffusing member 4 are disposed on the reflection part 71 of the reflective member 7.

The plurality of projections 41 provided in the light diffusing member 4 allows more stable placement of the light diffusing member 4 on the reflective member 7. In addition, since the reflective member 7 is supported by the strut member 6, the lighting device 1 can stably maintain the planar arrangement of the reflective member 7 and the light diffusing member 4 relative to the LEDs 3, and can thereby reduce uneven luminance.

Embodiment 4

Figure 8:
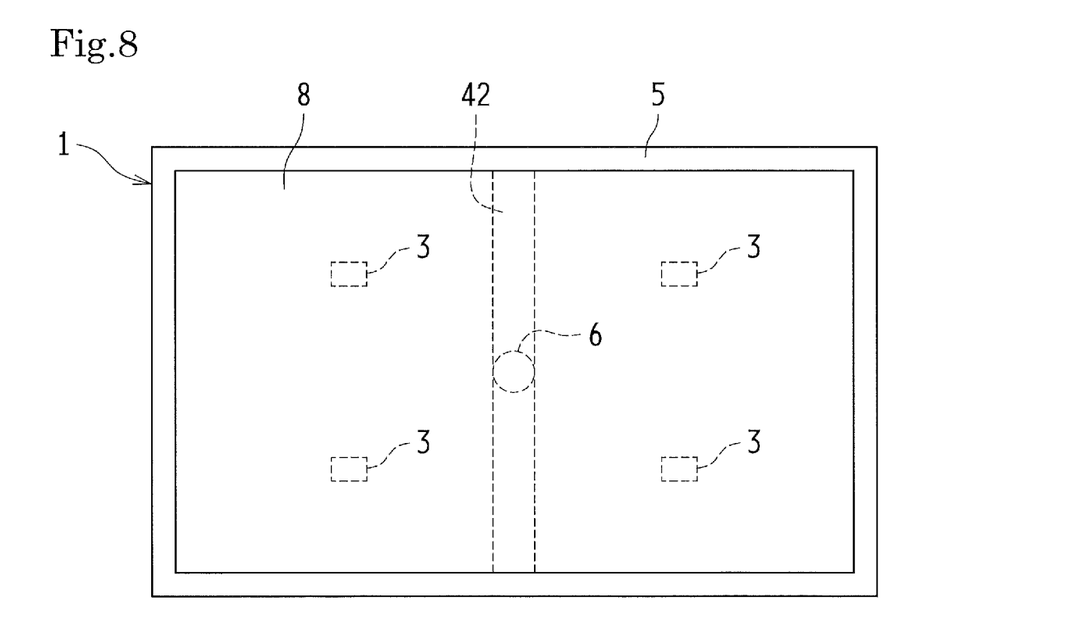
FIG. 8 is a plan view of a lighting device according to Embodiment 4 of the present invention.
Figure 9:
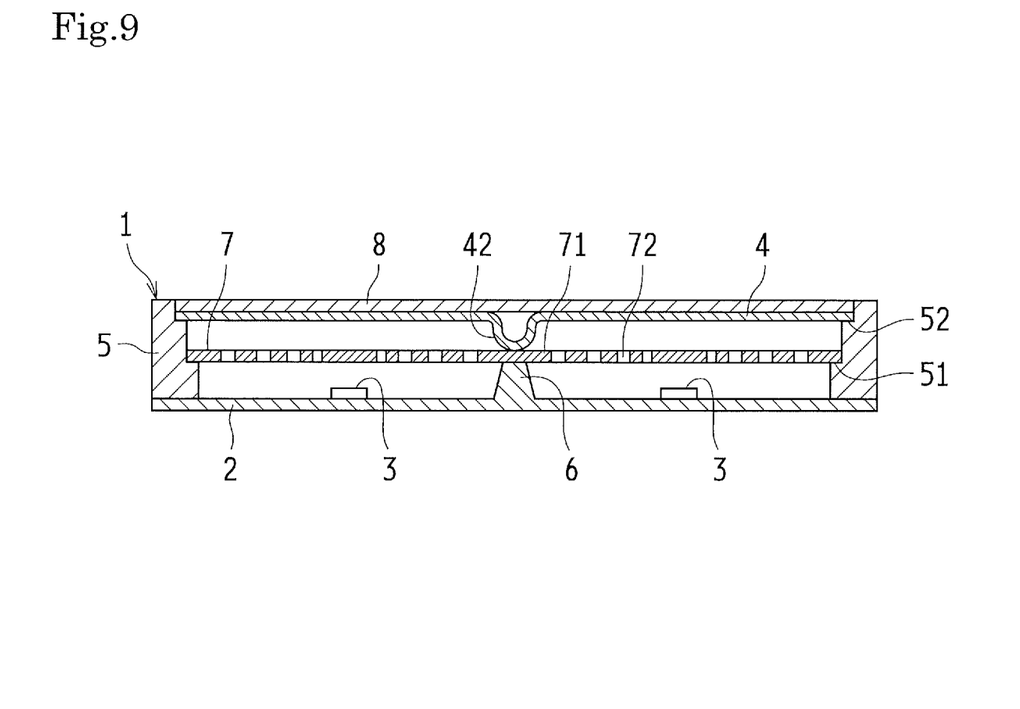
FIG. 9 is a sectional view of the lighting device according to Embodiment 4 of the present invention.
Figure 10:
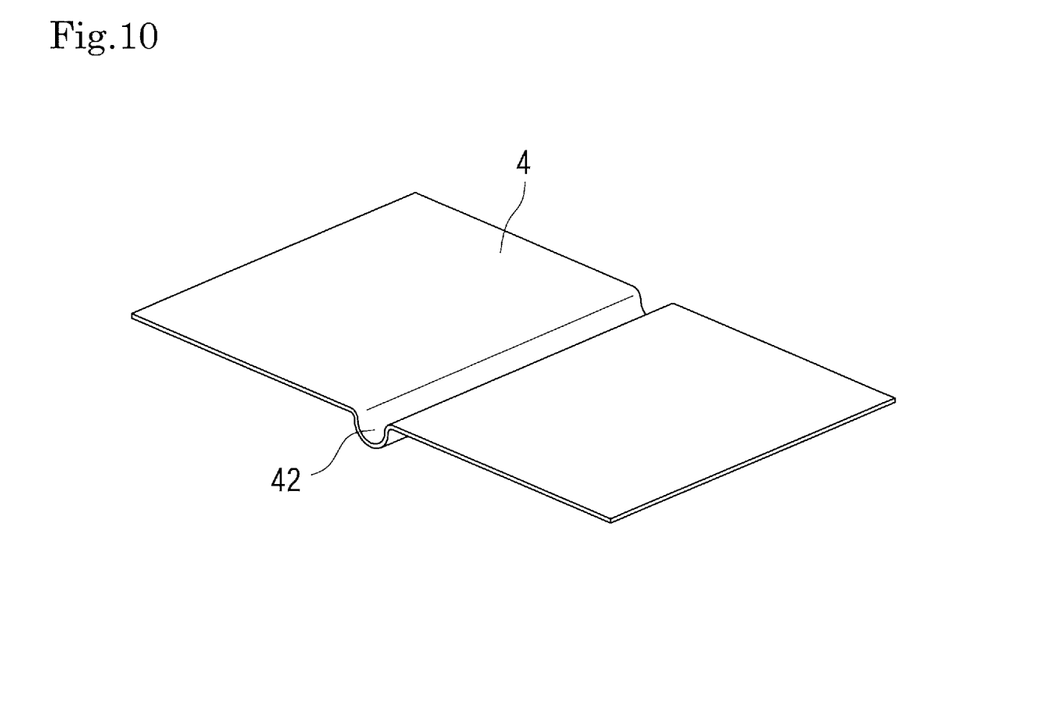
FIG. 10 is a perspective view of a light diffusing member in the lighting device shown in FIG. 9.

FIGS. 8 to 10 show a lighting device 1 according to Embodiment 4 of the present invention. FIG. 8 is a plan view, and FIG. 9 is a sectional view (corresponding to FIG. 3). FIG. 10 is a perspective view of a light diffusing member 4 applied to this lighting device 1.

The light diffusing member 4 provided in the lighting device 1 has a rib-like projection 42 extending in a predetermined direction. In the example shown in FIG. 10, the projection 42 is formed in the middle of the long edge of the light diffusing member 4, like a continuous straight line. The rib-like projection 42 is parallel to the short edge of the light diffusing member 4. The projection 42 in this embodiment is a recess having a substantially semi-circular cross section and is integrally formed in the light diffusing member 4 by sheet forming, die press molding, etc.

The rib-like projection 42 of the light diffusing member 4 serially abuts on the surface of the reflective member 7, thereby keeping a certain distance from the reflective member 7 and preventing deflection of the light diffusing member 4 more effectively. In addition, the strut member 6 is provided directly below the longitudinal middle part of the projection 42 via the reflective member 7, and stably supports the reflective member 7 and the light diffusing member 4. Owing to this configuration, the lighting device 1 can maintain the planar arrangement of the reflective member 7 and the light diffusing member 4 relative to the LEDs 3 without misalignment, and can thereby reduce uneven luminance.

Embodiment 5

Figure 11:
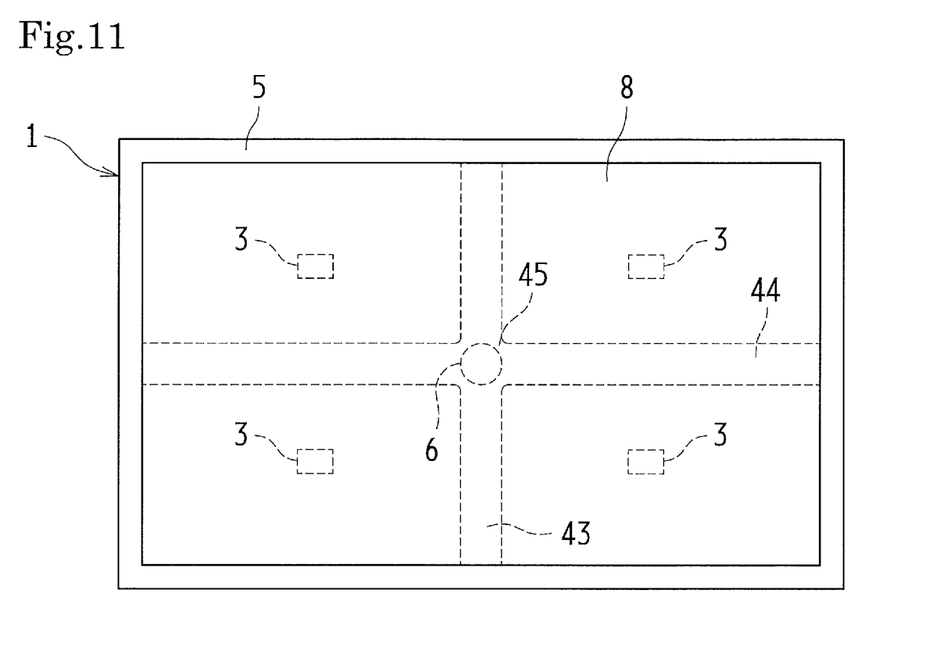
FIG. 11 is a plan view of a lighting device according to Embodiment 5 of the present invention.
Figure 12:
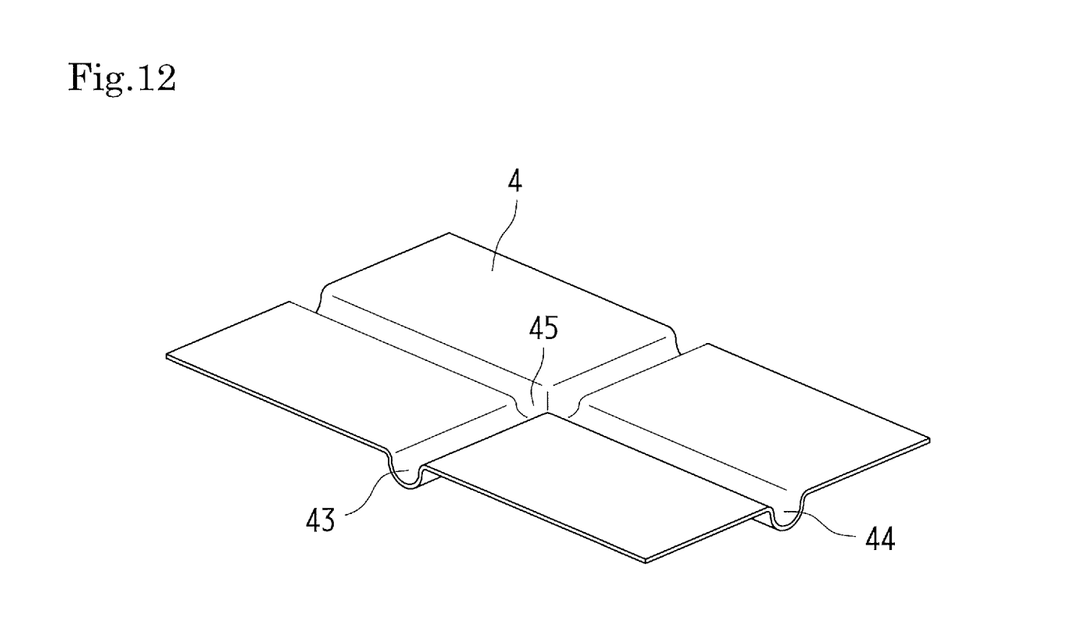
FIG. 12 is a perspective view of a light diffusing member in the lighting device shown in FIG. 11.

FIGS. 11 and 12 show a lighting device 1 according to Embodiment 5 of the present invention. FIG. 11 is a plan view, and FIG. 12 is a perspective view of a light diffusing member 4 applied to this lighting device 1.

The light diffusing member 4 provided in the lighting device 1 has a rib-like projection 42 composed of a plurality of projections that extend in different directions and that intersect with each other at an intersection 45. As illustrated, the projection 42 is composed of a first projection 43 provided in the middle of the long edge of the light diffusing member 4, and a second projection 44 provided in the middle of the short edge of the light diffusing member 4. Each projection is formed like a continuous straight line. Similar to the projection 42 in Embodiment 4, the first projection 43 is parallel to the short edge of the light diffusing member 4. The second projection 44 is parallel to the long edge of the light diffusing member 4. Each projection is a recess having a semi-circular cross section and is integrally formed in the light diffusing member 4 by sheet forming, die press molding, etc.

As shown in FIG. 11, the intersection 45 of the first projection 43 and the second projection 44 is provided at the center of the light diffusing member 4, above the strut member 6 on the substrate 2. The first projection 43 and the second projection 44 abut on the surface of the reflective member 7, serially in more than one direction, thereby keeping a certain distance from the reflective member 7 and preventing deflection of the light diffusing member 4 more effectively. In addition, the strut member 6 is provided directly below the intersection 45 via the reflective member 7, and stably supports the reflective member 7 and the light diffusing member 4. Owing to this configuration, the lighting device 1 can maintain the planar arrangement of the reflective member 7 and the light diffusing member 4 relative to the LEDs 3 without misalignment, and can thereby reduce uneven luminance.

Other Embodiments

Figure 13:
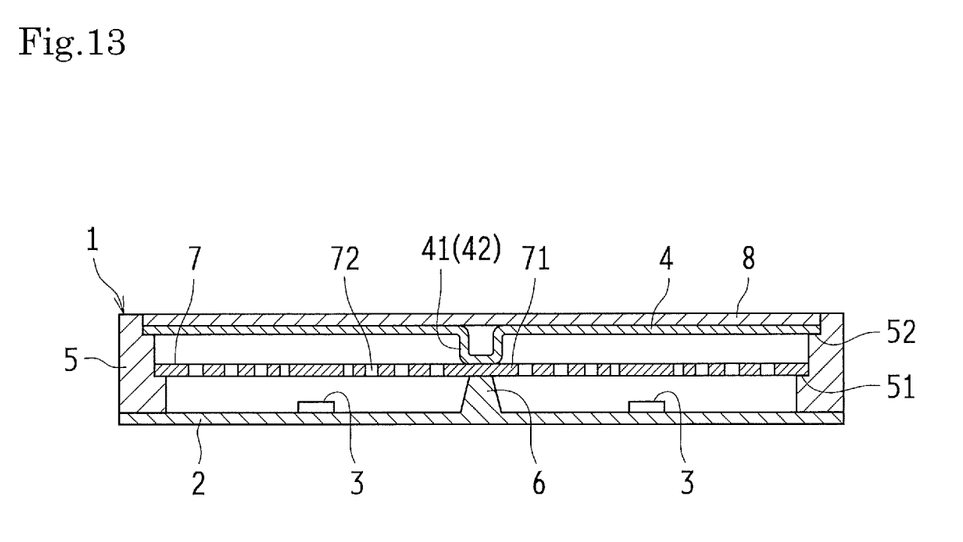
FIG. 13 is a sectional view of a lighting device according to another embodiment of the present invention.
Figure 14:
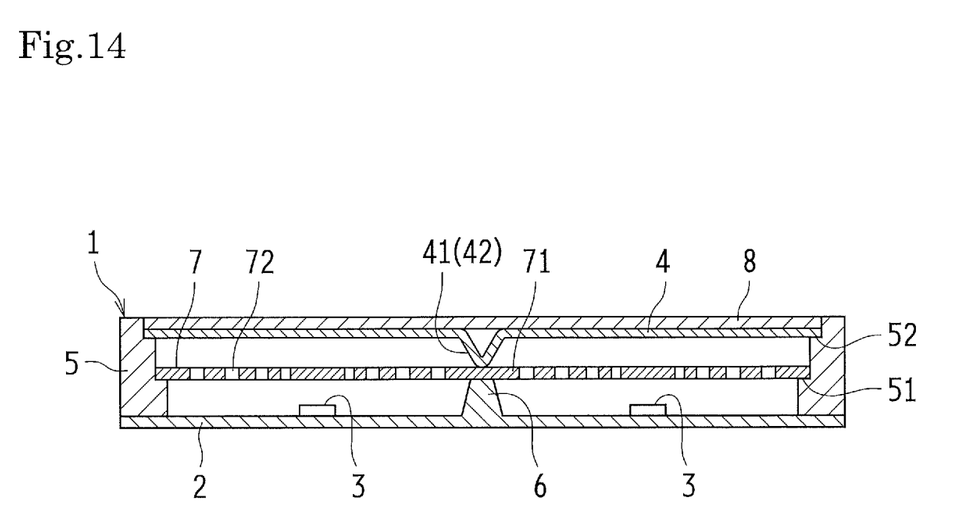
FIG. 14 is a sectional view of a lighting device according to yet another embodiment of the present invention.

FIGS. 13 and 14 are sectional views (corresponding to FIG. 3) of lighting devices 1 according to other embodiments.

The lighting device 1 and the display device 10 using the lighting device 1 according to the present invention can be put into practice not only in the manners described in the foregoing embodiments but also in other various forms. For example, regarding the lighting device 1, the projection 41(42) provided in the light diffusing member 4 is not limited to the shapes disclosed in the foregoing embodiments, and may have any other shapes.

As shown in FIG. 13, the cross section of the projection 41(42) of the light diffusing member 4 is not limited to a substantially semi-circular shape. Instead, the projection 41(42) may be a groove-like projection having a substantially rectangular cross section. Further, as shown in FIG. 14, the projection 41(42) of the light diffusing member 4 may have a substantially V-shaped cross section. Also in these cases, the strut member 6 is provided below the projection 41(42) via the reflective member 7. In addition, the projection 41(42) may be a single separate bump or a continuous rib.

The light diffusing member 4 and the optical sheet 8 in the lighting device 1 are not limited to a single-layer structure, and may be a laminated structure of two or more similar layers or a laminated structure of two or more different layers. The mount positions of the LEDs 3 on the substrate 2 are not limited to those mentioned in the foregoing embodiments, and may be arranged freely. It should be noted that the foregoing embodiments are merely given for illustration and not intended to limit the present invention.

Working Example

As a lighting device of Working Example, the lighting device 1 according to Embodiment 1 was produced with use of top-emitting white LEDs. For the reflective member 7, Lumirror® E20 (white PET film manufactured by Toray Industries, Inc.) was processed by die pressing to form openings in the specific pattern shown in FIG. 4 and thereby to provide a reflection part 71 and a transmission part 72. For the light diffusing member 4, a 0.218-mm-thick light diffusion film (manufactured by TSUJIDEN Co., Ltd.; trade name D121UPZ) was processed by sheet forming to form a projection 41 at the position shown in FIG. 1.

Lighting devices of Comparative Examples were produced in the same manner as in Working Example, except that the light diffusing members had no projections.

Figure 15A:
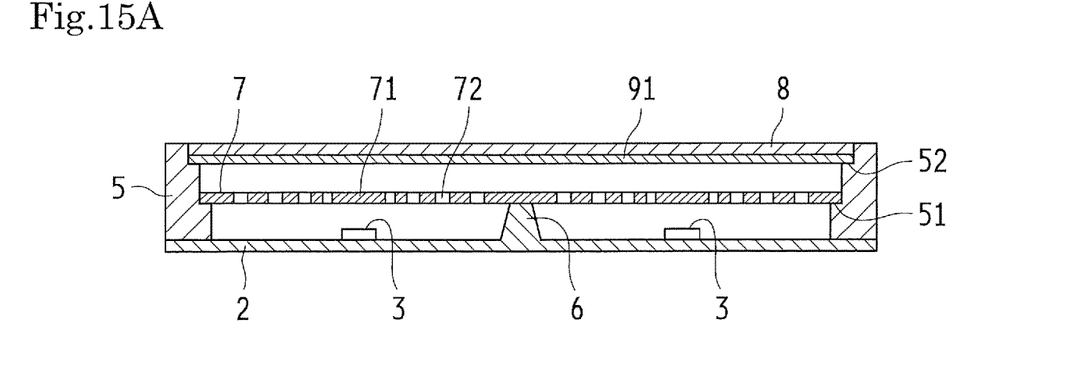
FIGS. 15A, 15B, and 15C are sectional views of lighting devices according to Comparative Examples 1, 2, and 3, respectively.
Figure 15B:
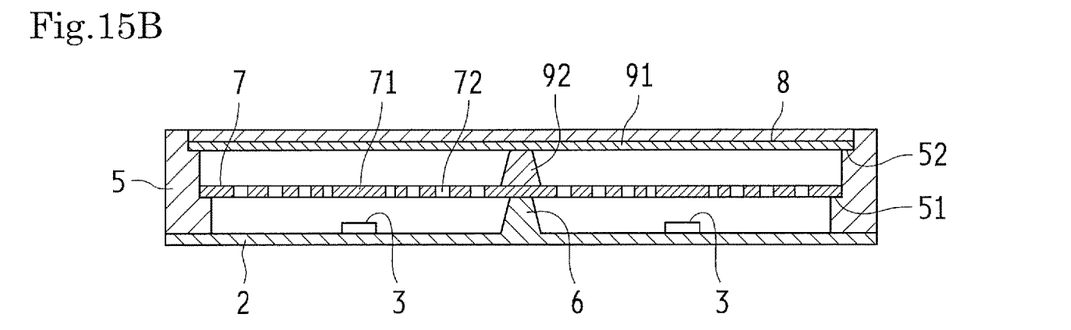
Figure 15C:
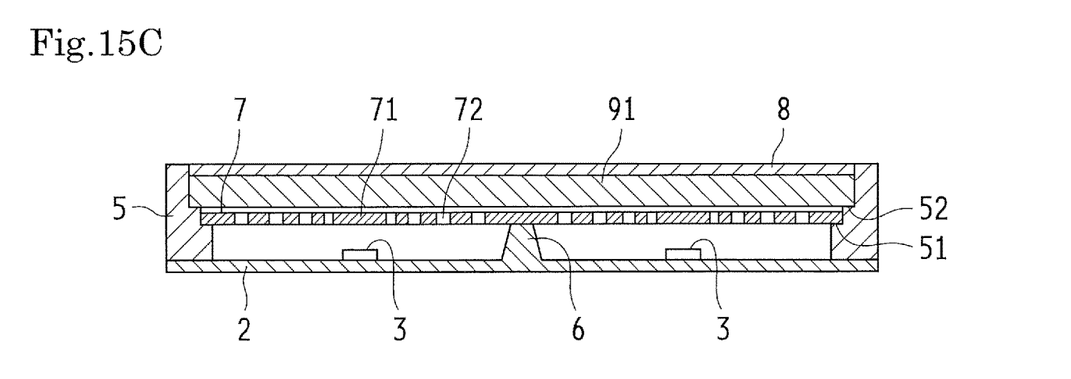

In Comparative Example 1 shown in FIG. 15A, a light diffusing member 91 had no projections. In Comparative Example 2 shown in FIG. 15B, a light diffusing member 91 had no projections, and a strut member 92 was provided on the backside of the light diffusing member 91. The strut member 92 was similar to the strut member 6 provided on the substrate 2. In Comparative Examples 1 and 2, the material for the light diffusing member 91 was the same as in Working Example, i.e., a 0.218-mm-thick light diffusion film (manufactured by TSUJIDEN Co., Ltd.; trade name D121UPZ). In Comparative Example 3 shown in FIG. 15C, a light diffusing member 91, also having no projections, was made of a 3-mm-thick light diffusion film (manufactured by TSUJIDEN Co., Ltd.; trade name D121UPZ), and was placed on the reflective member 7.

According to Working Example, the components could be set in the frame easily, and the lighting device had a less weight than the lighting devices in Comparative Examples 1 to 3. The lighting device of Working Example emitted light without uneven luminance. Even when the surface of the optical sheet was pressed, neither local variations in luminance nor uneven luminance was observed.

According to Comparative Example 1, the light diffusing member 91 deflected and could not be placed accurately. As a result, the luminance of emitted light was uneven.

According to Comparative Example 2, complicated installation of the strut member 92 required labor, time and cost. The resulting lighting device was heavier than the one according to Working Example. The luminance of emitted light was almost even.

According to Comparative Example 3, the light diffusing member 91 was so thick as to increase the weight of the device greatly. The lighting device in Comparative Example 3 was the heaviest of those obtained in Working Example and Comparative Examples 1 to 3, and required a higher cost for the light diffusing member 91. The luminance of the emitted light was almost even.

As understood from the above results, it was only the lighting device in Working Example that could guarantee high productivity, could prevent uneven luminance without increasing the weight and cost, and could emit light from the LED light source at an intensity equalized in the planar direction.

The above description has referred to the embodiments of the lighting device and the display device according to the present invention. However, the present invention is not limited to these embodiments and can be modified in various manners within the scope of the claims. The technical range of the present invention also encompasses other embodiments made by appropriate combinations of the technical measures disclosed in different embodiments. Further, the technical measures disclosed in the foregoing embodiments may be combined to create a new technical feature.

The present invention can be embodied and practiced in other different forms without departing from the spirit and essential characteristics of the present invention. Therefore, the above-described embodiments are considered in all respects as illustrative and not restrictive. The scope of the invention is indicated by the appended claims rather than by the foregoing description. All variations and modifications falling within the equivalency range of the appended claims are intended to be embraced therein.

What is claimed is:

1. A lighting device comprising a substrate, a light source provided on a surface of the substrate, and a light diffusing member configured to diffuse light emitted from the light source,
   wherein the light diffusing member comprises a sheet base or a film base having a light-diffusing resin layer, and at least one projection that protrudes in a direction of the substrate and that is integrated with the sheet base or the film base,
   further comprising a plate-like reflective member provided between the light source and the light diffusing member,
   wherein the reflective member comprises a reflection part configured to reflect the light emitted from the light source, and a transmission part configured to transmit the light emitted from the light source, and
   wherein the reflection part occupies a greater proportion of the reflective member than the transmission part, in an area closer to a spot above the light source.

2. The lighting device according to claim 1,
   wherein the light diffusing member is provided such that the projection is positioned above either of the reflection part or the transmission part.

3. The lighting device according to claim 1,
   wherein a strut member is provided upright on the substrate, and
   wherein the reflective member is supported by the strut member.

4. The lighting device according to claim 3,
   wherein the light diffusing member is provided such that the projection is positioned above the strut member.

5. The lighting device according to claim 1,
   wherein the light diffusing member comprises a plurality of projections.

6. The lighting device according to claim 1,
   wherein the projection is a rib-like projection extending in a predetermined direction of the light diffusing member.

7. The lighting device according to claim 6,
   wherein the projection comprises a plurality of projections that extend in different directions and that intersect with each other at an intersection, and
   wherein a strut member is provided upright on the substrate, and
      wherein the light diffusing member is provided such that the intersection is positioned above the strut member.

8. The lighting device according to claim 1,
   wherein the projection protrudes by 1 to 5 mm.

9. A display device comprising a display panel and a lighting device according to claim 1 configured to emit light from behind the display panel.

* * * * *